US008591773B2

(12) United States Patent
Wang

(10) Patent No.: US 8,591,773 B2
(45) Date of Patent: Nov. 26, 2013

(54) HETEROJUNCTION NANO MATERIAL, NEGATIVE POLE PIECE OF LITHIUM ION BATTERY, AND LITHIUM ION BATTERY

(71) Applicant: Huawei Technologies Co., Ltd., Shenzhen (CN)

(72) Inventor: Xingjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/720,241

(22) Filed: Dec. 19, 2012

(65) Prior Publication Data
US 2013/0209673 A1    Aug. 15, 2013

Related U.S. Application Data

(63) Continuation of application No. PCT/CN2012/078942, filed on Jul. 20, 2012.

(30) Foreign Application Priority Data

Feb. 9, 2012    (CN) .......................... 2012 1 0028855

(51) Int. Cl.
*H01B 1/08*    (2006.01)
(52) U.S. Cl.
USPC ...................... 252/518.1; 252/521.3; 977/773
(58) Field of Classification Search
USPC ............. 252/518.1, 521.3; 423/606; 977/948, 977/755, 773
See application file for complete search history.

(56) References Cited

U.S. PATENT DOCUMENTS 7,981,215 B2 *    7/2011    Gouma et al. .................. 117/75
2009/0191128 A1 *    7/2009    Ronda et al. ................... 424/9.4

FOREIGN PATENT DOCUMENTS

CN    1569368 A    1/2005
CN    102569763 A    7/2012

OTHER PUBLICATIONS

Xue et al "SnO2/α-MoO3 core-shell nanobelts and their extraordinarily high reversible capacity as lithium-ion battery anodes", Chem. Commun., 2011,47, 5205-5207.*
Chen et al "In situ diffusion growth of Fe2(MoO4)3 nanocrystals on the surface of α-MoO3 nanorods with significantly enhanced ethanol sensing properties", J. Mater. Chem., 2012,22, 12900-12906.*
Liu et al "Salt-Assisted Deposition of SnO2 on MoO3 Nanorods . . . ", J. Phys. Chem. B 2004, 108, 5867-5874.*
Wang Wendi et al, Hydrothermal Synthesis of MoO3 Nanofiber Electrode Material and Electrochemical Characterization, Functional Materials, Mar. 2006, vol. 37, No. 3.
Zhao Peng et al, Method for Preparing Molybdenum Trioxide Nanofiber Hydrothermally and Characterization, New Chemical Materials, Sep. 2009, vol. 37, No. 9.
International Search Report and Written Opinion of the International Searching Authority issued in corresponding PCT Patent Application No. PCT/CN2012/078942, mailed Nov. 22, 2012.

* cited by examiner

*Primary Examiner* — Mark Kopec
(74) *Attorney, Agent, or Firm* — Brinks Gilson & Lione

(57) ABSTRACT

The present application provides a heterojunction nano material, a negative pole piece of a lithium ion battery, and a lithium ion battery, where the heterojunction nano material includes a MoO$_3$ nanobelt and a metal oxide in the alloy lithium intercalation mechanism coated on the surface of the MoO$_3$ nanobelt. The negative pole piece of the lithium ion battery uses the heterojunction nano material as an active material, and the lithium ion battery using the negative pole piece of the lithium ion battery has a large reversible specific capacity and a high cycle stability.

1 Claim, 3 Drawing Sheets

HETEROJUNCTION NANO MATERIAL, NEGATIVE POLE PIECE OF LITHIUM ION BATTERY, AND LITHIUM ION BATTERY

CROSS-REFERENCE TO RELATED APPLICATIONS

This application is a continuation of International Application No. PCT/CN2012/078942, filed on Jul. 20, 2012, which claims priority to Chinese Patent Application No. 201210028855.6, filed on Feb. 9, 2012, both of which are hereby incorporated by reference in their entireties.

FIELD

The present application relates to chargeable lithium ion battery technologies, and in particular, to a method for manufacturing a $MoO_3$ nanobelt, a $MoO_3$ nanobelt, a heterojunction nano material, a negative pole piece of a lithium ion battery, and a lithium ion battery.

BACKGROUND

With a higher energy density and a longer cycle life, a lithium ion battery has become the most important power source of a portable electronic product and an electric automobile.

Generally, graphite materials are used for the negative pole material of a commercial lithium ion battery, because graphite materials have a high cycle stability during the process of lithium intercalation and extraction.

However, graphite materials encounter a lot of problems in practice. For example, the theoretical capacity of graphite materials is only 372 mAhg-1, and therefore hardly satisfies the requirement of high energy density of the lithium ion battery.

In addition, with a high theoretical reversible specific capacity, a metal oxide is also widely used to manufacture a large-capacity and high-energy density lithium ion battery. However, during the cycle process of metal oxide materials, the capacity sharply decreases in the initial irreversible reaction and the subsequent cycle process, resulting in a low cycle stability of the lithium ion battery.

In recent years, nanocrystallization of materials, especially use of one-dimensional nano structure, greatly improves the mechanical strength of the materials during the process of lithium intercalation and extraction, thereby enabling the materials to sustain a greater tension, and maximally maintaining structural integrity of the materials during the process of charge and discharge of the lithium ion battery. In this way, features of the negative pole of the lithium ion battery are effectively improved. For example, the one-dimensional nano structure of the metal oxide is used for the negative pole of the lithium ion battery, which may also effectively improve the cycle stability of the materials. However, due to limitations of the metal oxide materials, the reversible specific capacity and cycle stability of the metal oxide materials still fail to satisfy the application requirements of the commercial lithium ion battery.

Therefore, a novel negative pole is needed for the lithium ion battery, for improving the reversible specific capacity and cycle stability of the lithium ion battery.

In the prior art, metal oxide and carbon materials are compounded. This, in one aspect, improves the reversible specific capacity of the carbon material; and in another aspect, improves the cycle stability of the metal oxide material. Referring to Chinese Patent Application No. CN201010291060.5, graphene and stannic oxide are compounded and used for the negative pole of a lithium ion battery, achieving an initial reversible specific capacity of over 1000 mAhg-1 for the material. After cycling 20 times, the specific discharge capacity still remains at 600 mAhg-1. This greatly improves a performance of the negative pole of the lithium ion battery on which only a carbon material and a metal oxide material are applied.

Although this technical solution improves the reversible specific capacity and cycle stability of the lithium ion battery to some extent, the reversible specific capacity and cycle stability are still not satisfactory.

SUMMARY

In one aspect, embodiments of the present application provide a method for manufacturing a $MoO_3$ nanobelt, and a $MoO_3$ nanobelt, for making the appearance of the $MoO_3$ nanobelt more regular, thereby helping improve reversible specific capacity and cycle stability of a lithium ion battery.

In another aspect, embodiments of the present application provide a heterojunction nano material, for manufacturing a negative pole piece of a lithium ion battery, thereby improving reversible specific capacity and cycle stability of the lithium ion battery.

In still another aspect, embodiments of the present application provide a method for manufacturing a negative pole piece of a lithium ion battery, a negative pole piece of a lithium ion battery, and a lithium ion battery, for improving reversible specific capacity and cycle stability of the lithium ion battery.

An embodiment of the present application provides a method for manufacturing a $MoO_3$ nanobelt, including: dissolving ammonium molybdate in deionized water to obtain a mixed solution; adding concentrated nitric acid to the mixed solution, and then placing the mixed solution to a high-pressure reactor and heating the mixed solution; and cooling and cleaning the mixed solution to obtain a $MoO_3$ nanobelt.

The $MoO_3$ nanobelt manufactured by using the method for manufacturing a $MoO_3$ nanobelt provided in the embodiment of the present application has a more regular appearance, thereby ensuring a more excellent electrochemical property to satisfy further requirements of large reversible specific capacity and high cycle stability of a lithium ion battery.

An embodiment of the present application provides a heterojunction nano material, including a $MoO_3$ nanobelt and a metal oxide in the alloy lithium intercalation mechanism coated on the surface of the $MoO_3$ nanobelt.

An embodiment of the present application provides a method for manufacturing a negative pole piece of a lithium ion battery, where the heterojunction nano material described above is used as an active material, the method including: mixing the active material, conductive graphite, carboxy methyl cellulose CMC, and water; uniforming the obtained mixture with isopropyl alcohol, and uniformly coating the uniformed mixture on a copper piece to obtain a coated piece; and drying the coated piece in a vacuum, and pressing the coated piece to obtain a negative pole piece of a lithium ion battery.

The negative pole piece of the lithium ion battery manufactured by using the method for manufacturing a negative pole piece of a lithium ion battery provided in the embodiment of the present application is capable of improving the reversible specific capacity and cycle stability of the lithium ion battery.

A lithium ion battery provided with the negative pole piece of the lithium ion battery provided in the embodiments of the present application has a large reversible specific capacity and a high cycle stability.

BRIEF DESCRIPTION OF THE DRAWINGS

To illustrate the technical solutions in the embodiments of the present application or in the prior art more clearly, the following briefly describes the accompanying drawings required for describing the embodiments or the prior art. Apparently, the accompanying drawings in the following description merely show some embodiments of the present application, and persons of ordinary skill in the art can derive other drawings from these accompanying drawings without creative efforts.

DETAILED DESCRIPTION OF THE EMBODIMENTS

To make the objectives, technical solutions, and advantages of the present application more comprehensible, the following clearly and completely describes the technical solutions according to the embodiments of the present application with reference to the accompanying drawings in the embodiments of the present application. Apparently, the embodiments in the following description are merely a part rather than all of the embodiments of the present application. All other embodiments obtained by persons of ordinary skill in the art based on the embodiments of the present application without creative efforts shall fall within the protection scope of the present application.

Figure 1:
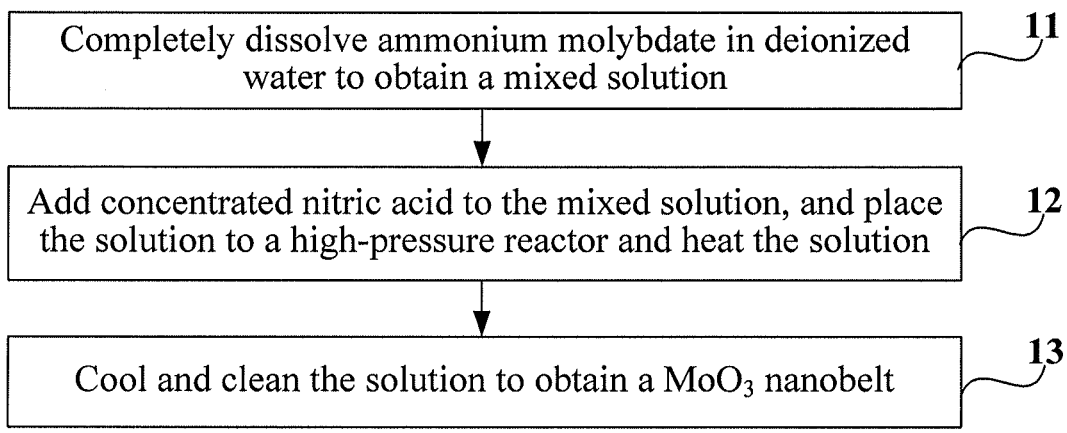
FIG. 1 is a flow chart of a method for manufacturing a $MoO_3$ nanobelt according to an embodiment of the present application.

FIG. 1 is a flow chart of a method for manufacturing a $MoO_3$ nanobelt according to an embodiment of the present application. As shown in FIG. 1, the method for manufacturing a $MoO_3$ nanobelt includes:

Step 11: Completely dissolve ammonium molybdate in deionized water to obtain a mixed solution. For example, 0.5-2 g of ammonium molybdate is completely dissolved in 20-45 ml of deionized water.

Step 12: Add concentrated nitric acid to the mixed solution, and place the mixed solution to a high-pressure reactor and heat the mixed solution. For example, the high-pressure reactor is heated at a temperature ranging from 100° C. to 250° C. for 10 to 48 hours.

Step 13. Cool and clean the mixed solution to obtain a $MoO_3$ nanobelt.

Specifically, for example, the 0.5-2 g of ammonium molybdate is dissolved in the 20-45 ml of deionized water under stir of a magnetic stirrer to obtain the mixed solution. After the ammonium molybdate is completely dissolved, 1-15 ml of concentrated nitric acid is added to the mixed solution, and the mixed solution is stirred for 2 minutes (min). Then, the mixed solution is transferred to the high-pressure reactor, and the high-pressure reactor is immediately placed to a furnace and is heated at a temperature ranging from 100° C. to 250° C. for 10 to 48 hours (h). After the reaction is complete, and the high-pressure reactor is cooled to the room temperature, a centrifugal cleaning method is used to collect the powder sample and obtain the $MoO_3$ nanobelt.

Figure 2A:
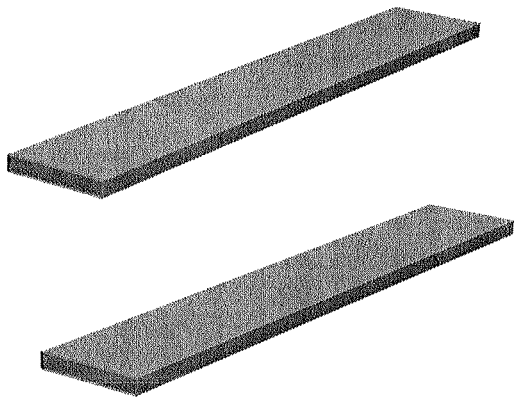
FIG. 2A is a schematic appearance diagram of a $MoO_3$ nanobelt according to an embodiment of the present application.
Figure 2B:
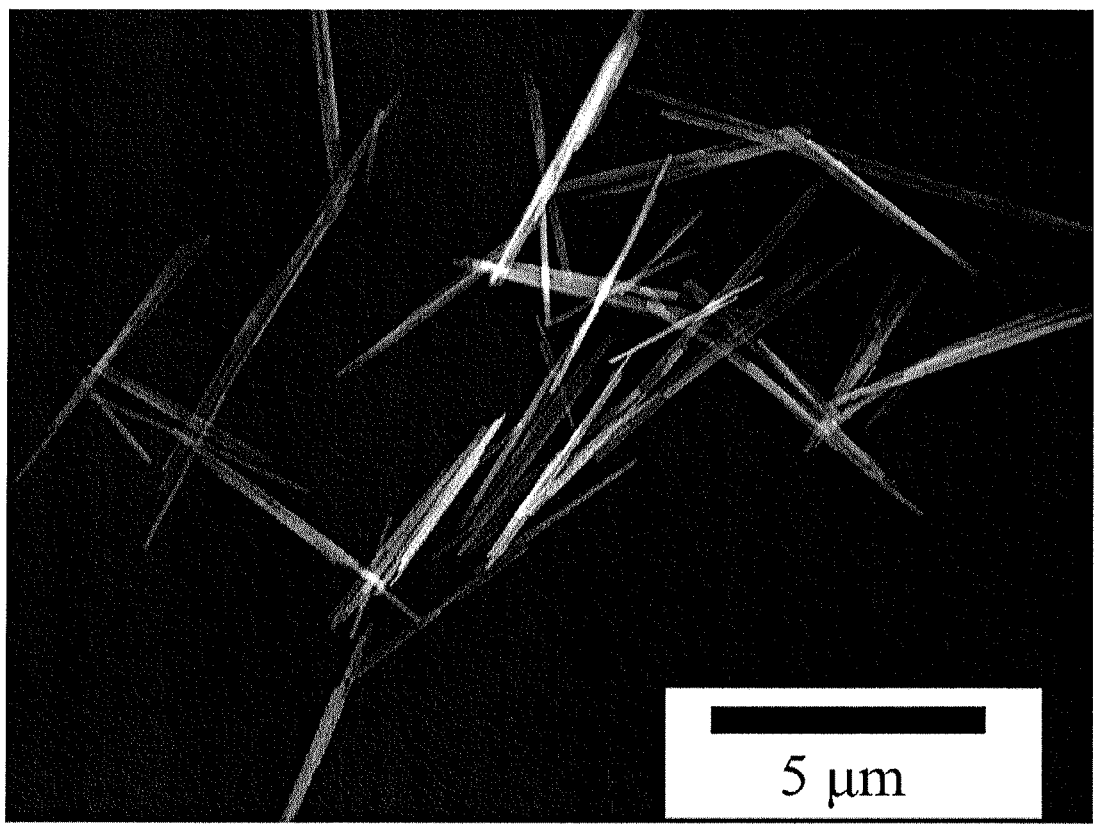
FIG. 2B is a scanning electron micrograph of a $MoO_3$ nanobelt according to an embodiment of the present application.

In this embodiment, the MoO3 nanobelt is manufactured using ammonium molybdate and concentrated nitric acid. The obtained MoO3 nanobelt is as shown in FIGS. 2A and 2B. It can be seen that the width of the MoO3 nanobelt is about 180 nm, with a more regular appearance, thereby ensuring a more excellent electrochemical property to satisfy further requirements of large reversible specific capacity and high cycle stability.

As regards the reversible specific capacity and cycle stability problems challenging the negative pole of a current lithium ion battery, an embodiment of the present application provides a heterojunction nano material. The heterojunction nano material includes: a $MoO_3$ nanobelt and a metal oxide in the alloy lithium intercalation mechanism coated on the surface of the $MoO_3$ nanobelt.

The $MoO_3$ nanobelt may be manufactured by using a conventional technology, or by using the method according to the embodiment illustrated in FIG. 1.

Figure 3A:
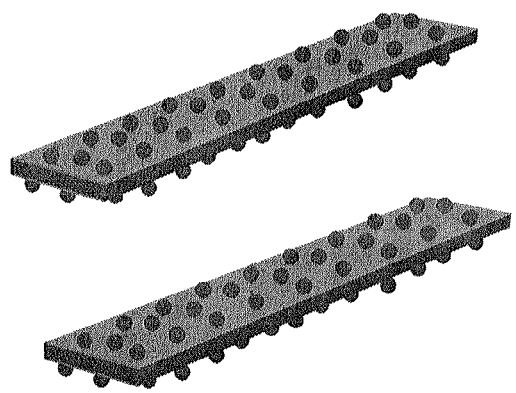
FIG. 3A is a schematic appearance diagram of a heterojunction nano material according to an embodiment of the present application.
Figure 3B:
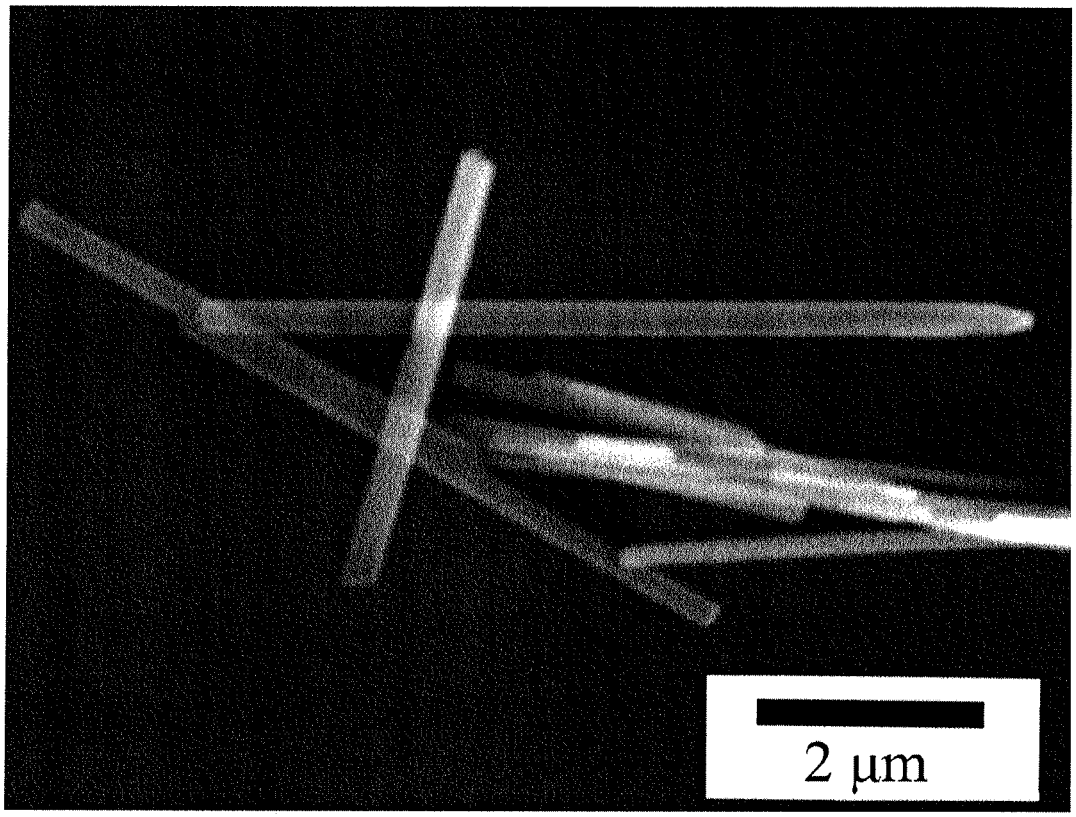
FIG. 3B is a scanning electron micrograph of a heterojunction nano material according to an embodiment of the present application.

When the $MoO_3$ nanobelt is manufactured by using the method according to the embodiment illustrated in FIG. 1, the heterojunction nano material is as shown in FIGS. 3A and 3B. Nano particles of the metal oxide ($MO_X$) in the alloy lithium intercalation mechanism are uniformly coated on the surface of the $MoO_3$ nanobelt. The width of the $MO_X$—$MoO_3$ nanobelt, that is, the heterojunction nano material, is about 220 nm, and the surface of the $MO_X$—$MoO_3$ nanobelt is smooth, indicating that the coated $MO_X$ material is uniform.

The metal oxide may include a metal of Al, Si, Sn, or Sb.

To uniformly coat the metal oxide ($MO_X$, M=Al, Si, Sn, or Sb in the alloy lithium intercalation mechanism on the surface of the $MoO_3$ nanobelt, hydrothermal method a sputtering method, a chemical vapor deposition method, a physical vapor deposition method, or the like may be used to synthesize the heterojunction nano material, which is a heterojunction nanobelt herein.

In the above embodiment, the nano materials of the metal oxide in the alloy lithium intercalation mechanism and the molybdenum oxide are compounded to form the heterojunction nano material. To improve the reversible specific capacity and cycle stability of the lithium ion battery, the heterojunction nano material is used in the research into the negative pole of the lithium ion battery herein.

Figure 4:
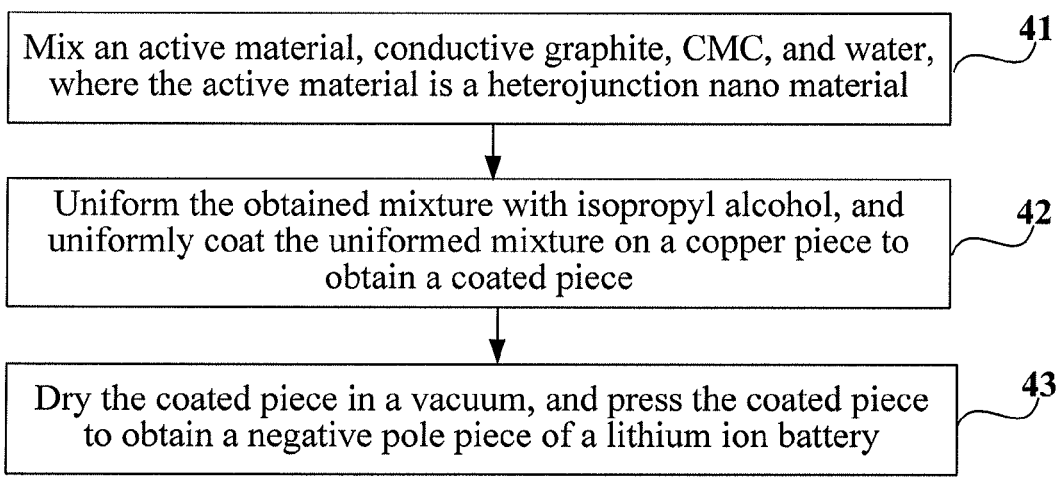
FIG. 4 is a flow chart of a method for manufacturing a negative pole piece of a lithium ion battery according to an embodiment of the present application.

FIG. 4 is a flow chart of a method for manufacturing a negative pole piece of a lithium ion battery according to an embodiment of the present application. As shown in FIG. 4, the method for manufacturing a negative pole piece of a lithium ion battery includes:

Step 41: Mix an active material, conductive graphite, CMC (Carboxy Methyl Cellulose), and water. Any of the heterojunction nano material provided in the above embodiment is used as the active material. The heterojunction nano material, the conductive graphite, the CMC, and the water may be mixed at a ratio of 8:1:1:100. The mix ratio is a mass ratio of the heterojunction nano material, the conductive graphite, the CMC, and the water.

Step 42: Uniform the obtained mixture with isopropyl alcohol, and uniformly coat the uniformed mixture on a copper piece to obtain a coated piece.

Step 43: Dry the coated piece in a vacuum, and press the coated piece to obtain a negative pole piece of a lithium ion battery. The process of drying the coated piece in a vacuum may include drying the coated piece in a vacuum at the temperature of 120° C. for over 24 hours.

For example, the active material, the conductive graphite, the CMC, and the water are mixed according to a mass ratio of 8:1:1:100, uniformed with isopropyl alcohol into slurry, and uniformly coated on the copper piece to obtain the coated piece. The coated piece is dried in a vacuum at the temperature of 120° C. for over 24 hours, and pressed to obtain the negative pole piece of the lithium ion battery.

In this embodiment, the negative pole piece of the lithium ion battery is manufactured from the heterojunction nano material described above, which is capable of improving the reversible specific capacity and cycle stability of the lithium ion battery.

An embodiment of the present application provides a lithium ion battery including the negative pole piece of the lithium ion battery manufactured according to the embodiment illustrated in FIG. 4. Therefore, the battery provided in this embodiment has a large reversible specific capacity and a high cycle stability.

The following describes verification through test.

First, a lithium ion battery is assembled. Specifically, the pole piece manufactured according to the embodiment illustrated in FIG. 4 is used as a working electrode, a metal lithium piece is used as an opposite electrode of the working electrode, 1 M (mol/L) of lithium hexafluorophosphate and EC (1,2-ethanediol carbonate, 1,2-ethanediol carbonate)/DMC (Dimethyl carbonate) with a volume ratio of 1:1 is used as an electrolytic solution, and a celgard2400 polypropylene porous film is used as a separator film. Finally, a 2016-button battery is assembled in a glove box full of noble gas.

Then, a LAND-CT2001A battery program controller is used to test constant current charge and discharge for the 2016-button battery, where the voltage ranges from 0.01 V to 2.75 V, and the charge and discharge current is 67 mAg-1.

The test results are listed in Table 1 and Table 2.

TABLE 1

Reversible specific capacities of the $MoO_3$ and heterojunction nanobelt after cycling 30 times

| | $Al_2O_3$—$MoO_3$ | $SiO_2$—$MoO_3$ | $SiO$—$MoO_3$ | $SnO_2$—$MoO_3$ | $Sb_2O_3$—$MoO_3$ | $MoO_3$ |
|---|---|---|---|---|---|---|
| Reversible Specific Capacity/ $mAhg^{-1}$ | 1127 | 1220 | 1360 | 1815 | 1134 | 1112 |

TABLE 2

Cycle stability of the $MoO_3$ and heterojunction nanobelt

| | Cycle Capacity Remaining Rate (%) | | | | | |
|---|---|---|---|---|---|---|
| Cycle Times | $Al_2O_3$—$MoO_3$ | $SiO_2$—$MoO_3$ | $SiO$—$MoO_3$ | $SnO_2$—$MoO_3$ | $Sb_2O_3$—$MoO_3$ | $MoO_3$ |
| 2 | 100 | 100 | 100 | 100 | 100 | 100 |
| 30 | 90.1 | 88.6 | 92.4 | 91.7 | 89.5 | 91.9 |
| 50 | 85.7 | 84.2 | 86.3 | 83.5 | 81.1 | 87.3 |

Table 1 lists specific discharge capacities of the manufactured $Al_2O_3$—$MoO_3$ nanobelt, $SiO_2$—$MoO_3$ nanobelt, $SiO$—$MoO_3$ nanobelt, $SnO_2$—$MoO_3$ nanobelt, $Sb_2O_3$—$MoO_3$ nanobelt, and $MoO_3$ nanobelt after cycling 30 times under a charge and discharge current of 67 mAg-1.

Table 2 lists percentages of the specific discharge capacities over the second remaining capacities of the manufactured $Al_2O_3$—$MoO_3$ nanobelt, $SiO_2$—$MoO_3$ nanobelt, $SiO$—$MoO_3$ nanobelt, $SnO_2$—$MoO_3$ nanobelt, $Sb_2O_3$—$MoO_3$ nanobelt, and $MoO_3$ nanobelt under a charge and discharge current of 67 mAg-1.

The $Al_2O_3$—$MoO_3$ nanobelt, $SiO_2$—$MoO_3$ nanobelt, $SiO$—$MoO_3$ nanobelt, $SnO_2$—$MoO_3$ nanobelt, $Sb_2O_3$—$MoO_3$ nanobelt, and $MoO_3$ nanobelt all are the heterojunction nano material provided in the above embodiment.

It can be seen from Table 1 that the reversible specific capacity of the lithium ion battery using the heterojunction nano material is greatly improved as compared with that of the original metal oxide. It can be seen from Table 2 that the cycle stability of the lithium ion battery using the heterojunction nano material is greatly improved as compared with that of the original metal oxide.

Finally, it should be noted that the above embodiments are merely intended for describing the technical solutions of the present application other than limiting the present applica tion. Although the present application is described in detail with reference to the foregoing embodiments, persons of ordinary skill in the art should understand that they can still make modifications to the technical solutions described in the foregoing embodiments, or make equivalent substitutions to some or all the technical features thereof, without departing from the spirit and scope of the technical solutions of the embodiments of the present application.

What is claimed is:

1. A heterojunction nano material, comprising a $MoO_3$ nanobelt and a metal oxide in the alloy lithium intercalation mechanism coated on the surface of the $MoO_3$ nanobelt, wherein the metal oxide comprises a metal selected from the following: Al, Si and Sb.

* * * * *